United States Patent [19]
Eckhardt

[11] Patent Number: 5,596,455
[45] Date of Patent: Jan. 21, 1997

[54] FIXED-FOCUS TRIPLET PROJECTION LENS FOR OVERHEAD PROJECTORS

[75] Inventor: Stephen K. Eckhardt, Austin, Tex.

[73] Assignee: Minnesota Mining and Manufacturing Company, St. Paul, Minn.

[21] Appl. No.: 496,773

[22] Filed: Jun. 29, 1995

[51] Int. Cl.$^6$ .................................................. G02B 9/14
[52] U.S. Cl. ........................................... 359/789; 359/785
[58] Field of Search ................................... 359/789, 785, 359/649, 651

[56] References Cited

U.S. PATENT DOCUMENTS

| | | |
|---|---|---|
| 540,122 | 5/1885 | Taylor . |
| 568,052 | 9/1896 | Taylor . |
| 1,035,408 | 8/1912 | Beck et al. . |
| 1,073,789 | 9/1913 | Wandersleb . |
| 1,485,929 | 3/1924 | Holst . |
| 1,616,765 | 2/1927 | Sonnefeld . |
| 1,658,365 | 2/1928 | Altman . |
| 1,880,393 | 10/1932 | Altman . |
| 1,892,162 | 12/1932 | Richter . |
| 1,937,168 | 11/1933 | Repp . |
| 1,987,878 | 1/1935 | Tronnier . |
| 2,064,550 | 12/1936 | Lee . |
| 2,270,234 | 1/1942 | Warmisham . |
| 2,279,372 | 4/1942 | Herzberger . |
| 2,298,090 | 10/1942 | Warmisham . |
| 2,388,869 | 11/1945 | Reiss . |
| 2,391,114 | 12/1945 | Aklin . |
| 2,416,033 | 2/1947 | Warmisham et al. . |
| 2,430,550 | 11/1947 | Altman et al. . |
| 2,453,260 | 11/1948 | Pestrecov . |
| 2,503,751 | 4/1950 | Litten et al. . |
| 2,582,362 | 1/1952 | Taylor . |
| 2,645,157 | 7/1953 | Lowenthal . |
| 2,720,814 | 10/1955 | Sandback . |
| 2,731,884 | 1/1956 | Brendel . |
| 2,736,234 | 2/1956 | Schlumpf . |
| 2,818,777 | 1/1958 | Hudson et al. . |
| 2,962,930 | 12/1960 | Johnson . |
| 3,194,116 | 7/1965 | Altman . |
| 3,202,051 | 8/1965 | Bechtold . |
| 3,237,520 | 3/1966 | Rickless et al. . |
| 3,359,057 | 12/1967 | Ackroyd . |
| 3,438,696 | 4/1969 | Ruben . |
| 3,438,697 | 4/1969 | Melech . |

(List continued on next page.)

FOREIGN PATENT DOCUMENTS

| | | | |
|---|---|---|---|
| 1037274 | 9/1953 | France | ........................................ 17/3 |
| 287089 | 1/1913 | Germany . | |
| 434759 | 12/1924 | Germany . | |
| 4118146C1 | 9/1992 | Germany | ........................ G02B 13/00 |
| 22607 | of 1895 | United Kingdom . | |
| 15107 | of 1895 | United Kingdom . | |
| 4714 | of 1911 | United Kingdom . | |
| 155640 | 12/1920 | United Kingdom . | |
| 422246 | 1/1935 | United Kingdom . | |
| 532950 | 2/1941 | United Kingdom . | |
| 601649 | 5/1948 | United Kingdom . | |
| 612757 | 10/1948 | United Kingdom . | |

OTHER PUBLICATIONS

"Modern Optical Engineering: The Design of Optical Systems" by Warren J. Smith Copyright 1990 by McGraw–Hill, Inc., pp. 384–391 no month.

"Lens Design Fundamentals" by Rudolf Kingslake, Copyright 1978 by Academic Press, Inc., 111 Fifth Avenue, New York, New York 10003, pp. 286–295 no month.

*Primary Examiner*—David P. Porta
*Assistant Examiner*—Richard Hanig
*Attorney, Agent, or Firm*—Gary L. Griswold; Walter N. Kirn; G. F. Chernivec

[57] ABSTRACT

A Cooke triplet projection lens for use in overhead projectors comprises two outer positive elements of an ophthalmic crown glass and one inner negative element of a light flint glass. The crown glass has a refractive index of roughly 1.523 and an Abbe value of 58.5. The flint has an index of less than 1.573 and an Abbe value of between 43 and 53. One of the positive elements is biconvex; the other is meniscus.

20 Claims, 2 Drawing Sheets

U.S. PATENT DOCUMENTS

| | | |
|---|---|---|
| 3,443,863 | 5/1969 | Ruben . |
| 3,443,864 | 5/1969 | Ackroyd . |
| 3,449,041 | 6/1969 | De Jager . |
| 3,578,847 | 5/1971 | Grey . |
| 3,584,936 | 6/1971 | Lowenthal . |
| 3,640,606 | 2/1972 | Conrad . |
| 3,649,103 | 3/1972 | Kamimura . |
| 3,762,801 | 10/1973 | Baker . |
| 3,784,287 | 1/1974 | Grey . |
| 3,838,910 | 10/1974 | Ruben . |
| 3,905,686 | 9/1975 | Ruben . |
| 3,910,685 | 10/1975 | DeJager . |
| 3,912,379 | 10/1975 | DeJager . |
| 3,936,155 | 2/1976 | Kirchhoff . |
| 3,944,337 | 3/1976 | Ruben . |
| 3,967,884 | 7/1976 | DeJager . |
| 4,105,308 | 8/1978 | Owen, Jr. et al. . |
| 4,109,995 | 8/1978 | Betensky . |
| 4,163,604 | 8/1979 | Betensky et al. . |
| 4,542,961 | 9/1985 | Sato . |
| 4,787,724 | 11/1988 | Kudo et al. . |

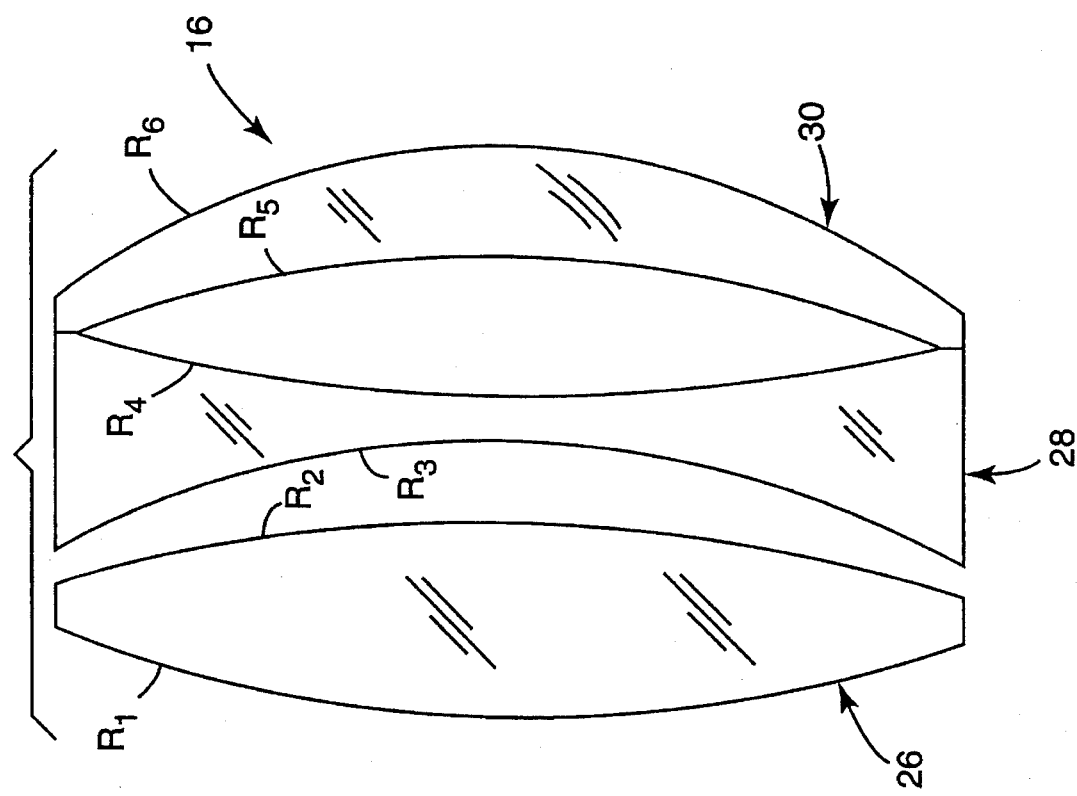
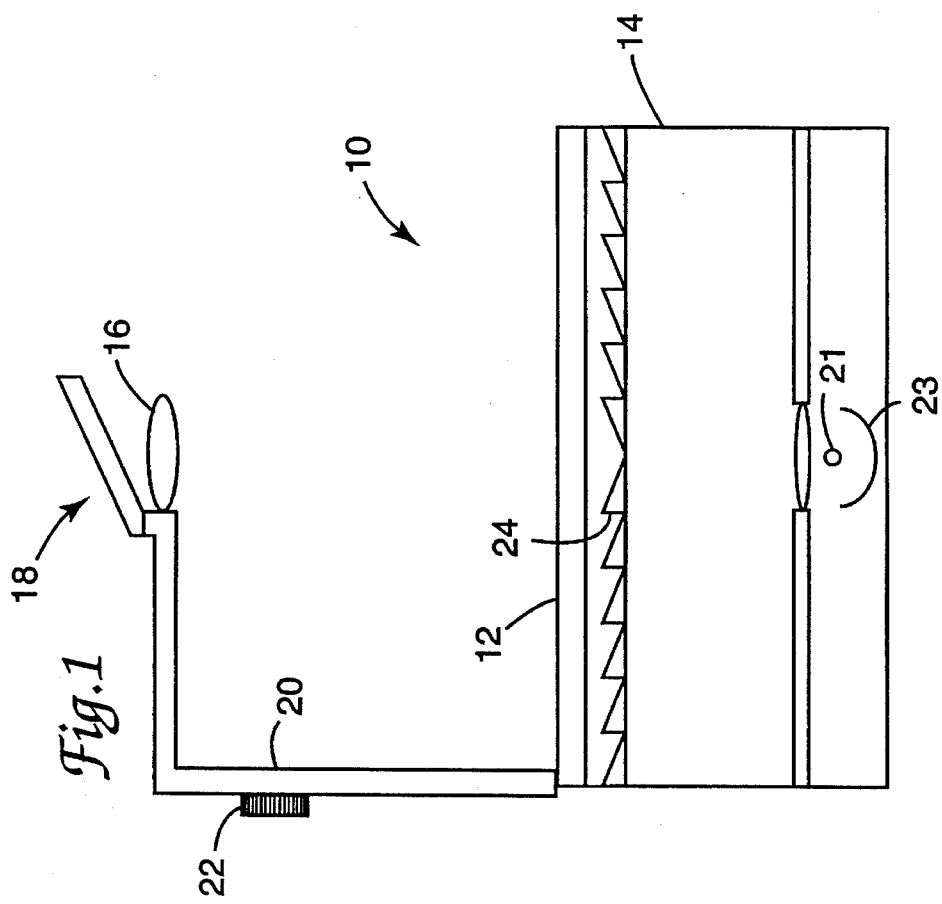

FIXED-FOCUS TRIPLET PROJECTION LENS FOR OVERHEAD PROJECTORS

BACKGROUND OF THE INVENTION

1. Field of the Invention

The present invention generally relates to optical lenses, and more particularly to a Cooke triplet projection lens designed for an overhead projector, the lens comprising two outer positive elements of an ophthalmic crown glass and one inner negative element of a light flint glass. The lens is constructed to provide superior performance at a low cost by selection of glass materials having specific optical characteristics.

2. Description of the Prior Art

The Cooke triplet lens was first invented in 1893 (see British Patent Nos. 15,107 and 22,607, and U.S. Pat. Nos. 540,122 and 568,052) and since that time, many variations on the design have been made. Of the several uses found for triplets, photographic and projection objectives are among the most important. Photography was the first application of this lens form, and continues to be important (see U.S. Pat. Nos. 1,035,408, 1,073,789, 1,616,765, 1,658,365, 1,880,393, 1,892,162, 1,987,878, 2,064,550, 2,270,234, 2,279,372, 2,298,090, 2,388,869, 2,391,114, 2,416,033, 2,430,550, 2,582,362, 2,645,157, 2,736,234, 2,962,930, 3,194,116, 3,359,057, 3,438,696, 3,443,863, 3,449,041, 3,578,847, 3,640,606, 3,649,103, 3,784,287, 3,912,379, 3,944,337, 3,967,884, 4,542,961, British Patents 4,714 (1911), 422,246 (1933), 532,950 (1939), 601,649 (1948), 612,757 (1948), German Patent 434,759 (1924), and French Patent 1,037,274 (1953)). Among projection applications, the Cooke triplet has been used in CRT television projectors (U.S. Pat. No. 4,163,604), motion picture projectors (U.S. Pat. Nos. 2,503,751, 2,720,814,), slide projectors (U.S. Pat. Nos. 1,937,168, 3,237,520, 3,443,864 and 3,905,686) and overhead projectors (U.S. Pat. No. 3,936,155). A few patents exist for triplets used for photocopying and other applications (U.S. Pat. Nos. 1,485,929, 1,937,168, 3,202,051 and 3,584,936).

The Cooke triplet has taken two basic forms in overhead projectors: fixed focus (see the '155 patent) and varifocal (see German Patent No. 4,118,146). In the latter, the separation between lens elements is varied to adjust the focal length of the lens. The varifocal lens reduces the complexity of the projector, while the fixed focus lens is generally capable of superior performance.

A Cooke triplet lens generally consists of three pieces of glass or polymers, called elements, housed in a mechanical structure which is called the barrel. The outside first and last elements are usually of positive optical power, and the inner element is usually negative. The opposite arrangement has been tried, but found to be less desirable. Design methods for this type of lens are widely published (see, e.g., Warren J. Smith, "Modern Optical Engineering," section 12.6, or Rudolf Kingslake, "Lens Design Fundamentals," chapter 13, section V).

It is often recommended that the refractive indices of the chosen glasses be high and this practice has been maintained since the original patents. An extreme example of this is U.S. Pat. No. 3,838,910, in which the lens is constructed of glasses with a refractive index greater than 1.9. The rationale for this practice is based on the relationship between refractive index and the spherical aberration of a simple lens (i.e., single element). Increasing the refractive index of the element reduces the curvatures of the lens for a given focal length, which reduces the change in angle of incidence with pupil height, and therefore reduces spherical aberration. This suggests that high refractive indices are most helpful in lenses that work at a fast f-number.

U.S. Pat. No. 2,731,884 teaches that the average of the refractive indices of the positive elements of a triplet should be greater than the refractive index of the negative element, to improve the field coverage by decreasing the Petzval curvature of the lens. This can be understood by noting that the Petzval curvature is equal to the sum of the powers of the elements divided by their refractive indices. For the lens to have a positive focal length, the powers of the positive elements must be greater than the power of the negative element. Hence, Petzval curvature would be significant if the refractive indices were equal. Increasing the refractive indices of the positive elements with respect to the refractive index of the negative element reduces field curvature.

Overall length of the lens (also known as barrel length) is another important parameter in the design of projection lenses for overhead projectors. It is defined as the axial distance from the first lens surface to the last lens surface. As noted in the '155, a shorter lens can be built with smaller lens diameters and consequently less material, thereby reducing material and other costs. This also improves the mechanical stability of the overhead projector. U.S. Pat. No. 3,762,801 also stresses the importance of a short overall length but its emphasis is on the compactness of the resulting camera.

Smith, supra, states a general principle that reducing the difference in the Abbe values of the crown and flint elements will shorten the overall length of an optimized lens and increase its field coverage at the cost of reduced aperture. This principle is important for the design of all anastigmats, not just triplets, and gives a designer a suggestion for improving a lens in any particular application. Smith cites three patented lenses (U.S. Pat. No. 2,453,260, British Patent No. 155,640 and German Patent 287,089) as examples of good designs that have a larger Abbe value difference for a fast, smaller field lens ($\Delta v=22$) and a smaller Abbe value difference for a slower, larger field lens ($\Delta v=15$). Conversely, U.S. Pat. No. 3,762,801 describes shorter, slower, narrower field lenses with similar Abbe value differences, but requires an aspheric component or high refractive indices for adequate aberration correction.

A teaching that is implicit in several patents, including U.S. Pat. Nos. 2,818,777, 3,762,801, 3,838,910, 3,910,685, 4,105,308, 4,109,995 and 4,787,724, is the use of a meniscus positive element. All of these patents describe the use of such an element, but fail to teach any advantage associated therewith. According to Kingslake (p.240), "Gauss once suggested that a telescope objective could be made with two meniscus-shaped elements, the advantage being that such a system would be free from spherochromatism." He continues by noting that Alvan Clark had the insight that two of these objectives, back to back, would make a good camera lens. That camera lens is now widely known as the Double Gauss type and is used for high quality camera objectives. Lenses of this type have a high degree of correction. Another well know use of meniscus elements is as spherical aberration "correctors" in Bouwers-Maksutov telescopes (Kingslake, p. 311ff.). In these lenses, the meniscus is used to compensate the spherical aberration of a spherical primary mirror.

In spite of the foregoing teachings, prior art Cooke triplet lenses, particularly those suited for use in overhead projectors, still suffer certain disadvantages such as spherical aberration, coma and astigmatism, and while a given one of these defects may be improved by adjusting certain parameters of the elements, the other defects are magnified in the process. There is also a constant drive in the manufacture of overhead projectors for a decrease in manufacturing cost, while maintaining or improving product quality. It would, therefore, be desirable and advantageous to devise a construction of a Cooke triplet lens which is compact and relatively inexpensive, and yet which achieves superior performance in the noted characteristics, i.e., generally provides a sharper, true image.

SUMMARY OF THE INVENTION

The present invention provides a projection lens for an overhead projector, the lens generally comprising two positive outer elements of an ophthalmic crown glass and an inner negative element of a light flint glass. One of the positive elements is biconvex; the other is meniscus. The biconvex element may be equiconvex. Preferably, the crown glass has a refractive index of roughly 1.523 and an Abbe value of about 58.5, or at least in the range of 58–60. The flint has an index of less than 1.573 and an Abbe value of between 43 and 53, preferably between 48 and 52.5. The overall length of the lens is less than one-sixth of the focal length.

BRIEF DESCRIPTION OF THE DRAWINGS

The invention will best be understood by reference to the accompanying drawings, wherein:

FIG. 1 is a sectional view of a generalized overhead projector using a projection lens constructed in accordance with the present invention;

FIG. 2 is a schematic diagram of an axial section of a preferred embodiment of lens of the present invention.

DESCRIPTION OF THE PREFERRED EMBODIMENT

Figure 3:
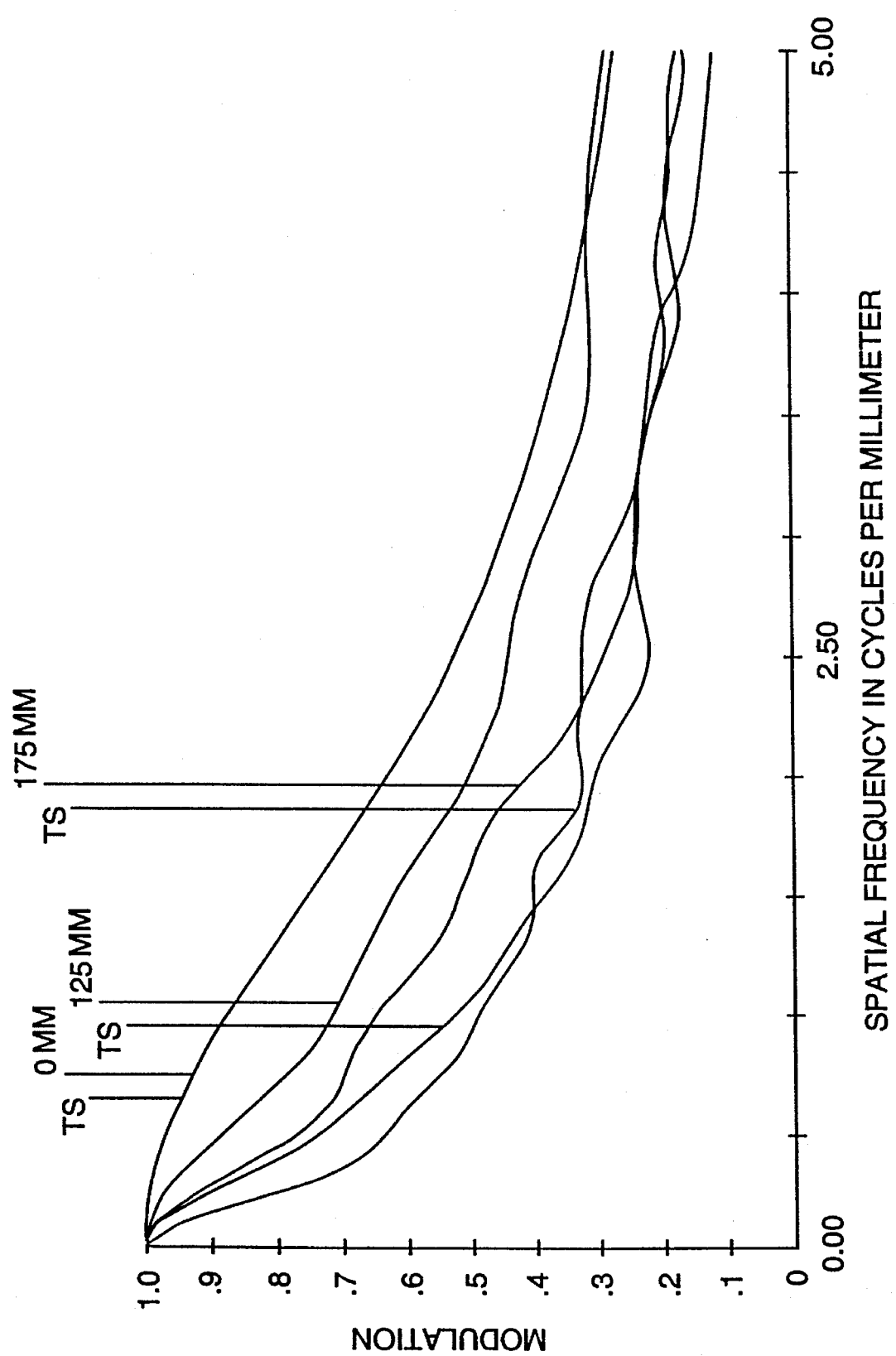
FIG. 3 is a is the modulation transfer function (MTF) plot for a preferred embodiment of the invention.

In Cooke triplet lenses, as in the above examples, the meniscus is used to correct zonal aberration. If the inner surface of the meniscus element in a given design is changed to a plane and the design is reoptimized, coma correction is improved (due to the increased symmetry of the lens) but both spherical aberration and astigmatism are greatly increased. The present invention overcomes this problem by allowing the lens to bend into its desired meniscus form, decreasing the chief ray angle of incidence on both surfaces, thus decreasing astigmatism, and inducing negative spherical aberration which compensates for the strong positive spherical aberration of the first element.

In addition to its aberration correction capability, the meniscus element can have a helpful effect on the lens tolerances. Because of the decreased chief ray angle of incidence, this element has relatively loose tolerances on its curvatures and thicknesses, resulting in improved manufacturing economy and performance of finished lenses. This effect is accentuated when the meniscus is the component farthest from the stop. In overhead projectors (OHP's), such as the generalized OHP 10 illustrated in FIG. 1, the stop is the image of the illumination source, i.e., the lamp 21. The novel, multi-element projection lens 16 of the present invention is located in the projector head 18, which is typically attached to base 14 by an arm 20. To minimize the size of projector head 18, it is desirable to have the stop on the side of the lens closest to the screen. This makes it preferable, but not imperative, that the meniscus element of lens 16 be on the side of the lens closest to the transparency being projected.

FIG. 1 shows other features of a typical OHP including means, such as a rotatable knob 22 mounted rack-and-pinion on arm 20, to adjust the effective height of head 18, a light source or lamp 21, a back reflector or mirror 23, and a Fresnel lens 24 located at the stage area 12. This particular embodiment of OHP 10 should not, however, be construed in a limiting sense, since projection lens 16 is equally useful in other variations of OHP designs. For example, the illustrated design is a transmissive-type OHP, but lens 16 can also be used with reflective-type OHP's.

One possible means of reducing the cost of triplet lenses is to use less expensive types of glass, or polymers. Polymers are generally undesirable in overhead projectors, however, because the high concentration of energy in proximity to the lens can lead to thermal deformation and the attendant loss of performance. This leaves only glass as a suitable material. The cost of glass is affected by its constituents and the precision with which it is produced. Projection lenses are commonly made from special "optical quality" glass. Ophthalmic lenses are made of an "ophthalmic crown," such as Schott B270 or Corning B23-59. Although the manufacturing process for ophthalmic grade glass is less carefully regulated than for optical grade glasses, the quality is sufficient for use in overhead projection lenses. It is therefore an object of the present invention to produce a projection lens of improved quality using ophthalmic crown glass. The index of refraction of the crown elements is in the range of 1.518 to 1.528, and the Abbe number is in the range of 58–60.

With reference now to FIG. 2, there is depicted the projection lens 16 of the present invention. Lens 16 is generally comprised of three elements 26, 28 and 30. The outside elements 26 and 30 are composed of an ophthalmic crown glass, and the inner element 28 is composed of a very light flint glass. This light flint has a low dispersion which imparts to the lens field coverage sufficient for an overhead projector. The Abbe number for the flint should be such that $5.5 < [(v_1+v_3)/2 - v_2] < 15.5$, where $v_1$, $v_2$ and $v_3$ are the Abbe values of elements 26, 28 and 30, respectively; the Abbe numbers most preferably conform to the equation $6 < [(v_1+v_3)/2 - v_2] < 10.5$. Inner element 30 preferably has a refractive index of less than about 1.573, and an Abbe number between 43 and 53, most preferably between 48 and 52.5. In addition, the field coverage of the lens is aided by its low refractive index. Ideally, the refractive index of the flint should be lower than that of the crown. Unfortunately, such glass is not available at a low cost, so the flint may instead have a refractive index which is less than $(n_1+n_3)/2+0.05$ where $n_1$ and $n_3$ are the indices of refraction of elements 26 and 30, respectively. This is sufficient to provide acceptable performance over the required field.

The overall (physical) length of a lens constructed in accordance with the present invention is less than one-sixth of its focal length, but it is not necessary to asphernize the surfaces of the negative element, or else use very high refractive indices, in order to obtain this short overall length, as is often required in the prior art.

EXAMPLE 1

A specific design example is now given for the triplet projection lens. The lens is scaled to a focal length of 345 mm; its f/number at infinity is f/6.2, but the lens diameters are 65.4 mm to allow for mounting and focusing. An overhead projector is normally designed with a maximum image height of 176 mm, and a nominal magnification of −0.19. In the following tables, the surface numbers 1–6 correspond to surfaces $R_1$–$R_6$, respectively, of FIG. 2. The radii values are positive if the center of curvature is to the right of the surface, and are negative if the center of curvature is to the left of the surface. Thickness is the distance to the next surface; the final thickness is the effective distance from the last lens surface to stage area 12. The refractive index, $n_d$, and the Abbe value, $v_d$, are for the material following the surface (i.e., "1.000" is an air gap). The refractive index is given for the helium-d wavelength (587.6 nm) and the Abbe value is given for the red and blue hydrogen lines C (656.3 nm) and F (486.1 nm). The stop is at the second surface. The crown elements are preferably Schott B270 and the flint element is Schott LLF6.

| Surface # | Radius (mm) | Thickness (mm) | $n_d$ | $v_d$ |
|---|---|---|---|---|
| 1 | 93.523 | 13.74 | 1.523 | 58.5 |
| 2 | −112.996 | 6.00 | 1.000 | |
| 3 | −64.327 | 3.00 | 1.532 | 48.8 |
| 4 | 125.431 | 10.07 | 1.000 | |
| 5 | −85.064 | 8.20 | 1.523 | 58.5 |
| 6 | −51.164 | 380.00 | 1.000 | |

FIG. 3 shows the modulation transfer function (MTF) plot for Example 1 based on a computer model. The five curves correspond, respectively, to the on-axis modulation, the tangential and sagittal modulation at 125 mm off-axis, and the tangential and sagittal modulation at 176 mm off-axis. Since the human eye can discriminate a modulation as low as 10–15%, it will be appreciated from this graph that a lens constructed in accordance with the present invention provides superior resolution, i.e., 5 cycles/mm (on the short conjugate side).

EXAMPLE 2

A second design example is given in which the front crown 26 is equiconvex. The focal length has been changed to 356 mm in order to preserve the back focal distance of 380 mm. The stop is again at the second surface.

| Surface # | Radius | Thickness | $n_d$ | $v_d$ |
|---|---|---|---|---|
| 1 | 101.222 | 13.86 | 1.523 | 58.5 |
| 2 | −101.222 | 5.29 | 1.000 | |
| 3 | −60.820 | 3.00 | 1.532 | 48.8 |
| 4 | 139.165 | 9.97 | 1.000 | |
| 5 | −81.173 | 8.33 | 1.523 | 58.5 |
| 6 | −49.636 | 380.00 | 1.000 | |

EXAMPLE 3

A third design example is given in which the meniscus element is closest to the screen, that is, on the long conjugate side. The focal length is 342 mm, and the stop is on the fourth surface. The flint 30 in this example is slightly more dense than in the previous examples (Schott LLF1).

| Surface # | Radius | Thickness | $n_d$ | $v_d$ |
|---|---|---|---|---|
| 1 | 46.929 | 8.33 | 1.523 | 58.5 |
| 2 | 79.192 | 8.68 | 1.000 | |
| 3 | −232.224 | 3.00 | 1.548 | 45.8 |
| 4 | 54.993 | 7.12 | 1.000 | |
| 5 | 98.683 | 13.03 | 1.523 | 58.5 |
| 6 | −122.329 | 380.00 | 1.000 | |

EXAMPLE 4

A fourth design example is given in which the meniscus element is closest to the transparency, that is, on the short conjugate side. The focal length is still 342 mm, and the stop is on the second surface. The flint 30 in this example is slightly less dense than in the previous examples (Schott KF9).

| Surface # | Radius | Thickness | $n_d$ | $v_d$ |
|---|---|---|---|---|
| 1 | 95.366 | 14.09 | 1.523 | 58.5 |
| 2 | −103.288 | 5.68 | 1.000 | |
| 3 | −60.592 | 3.00 | 1.523 | 51.5 |
| 4 | 124.507 | 10.37 | 1.000 | |
| 5 | −81.626 | 8.28 | 1.523 | 58.5 |
| 6 | −49.906 | 380.00 | 1.000 | |

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, those skilled in the art will appreciate that the various dimensions given for the lens elements herein are based on a particular focal length, and so would be appropriately scaled if used at a different focal length. It is therefore contemplated that such modifications can be made without departing from the spirit or scope of the present invention as defined in the appended claims.

I claim:

1. A multi-element lens comprising:
   first and second lens elements, each being a positive lens and constructed of ophthalmic crown glass having an index of refraction in the range of 1.518 to 1.528; and
   a third lens element interposed between said first and second lens elements, said third lens element being a negative lens constructed of light flint, the Abbe numbers for said first, second and third lens elements conforming to the equation $5.5 < [(v_1 + v_3)/2 - v_2] < 15.5$, where $v_1$, $v_2$ and $v_3$ are the Abbe numbers of said first, third and second lens elements, respectively.

2. The lens of claim 1 wherein said first lens element is biconvex and said second lens element is meniscus.

3. The lens of claim 1 wherein the Abbe numbers for said first, second and third lens elements conform to the equation $6 < [(v_1 + v_3)/2 - v_2] 10.5$.

4. The lens of claim 1 wherein the multi-element lens has an overall length which is less than one-sixth of its focal length.

5. The lens of claim 1 wherein said third lens element has a refractive index of less than about 1.573 and an Abbe number between 43 and 53.

6. The lens of claim 1 wherein the Abbe number for said first and third lens elements is in the range of 58–60.

7. The lens of claim 2 wherein said first lens element is equiconvex.

8. The lens of claim 4 wherein said third lens element has a refractive index of less than about 1.573 and an Abbe number between 43 and 53.

9. The lens of claim 8 wherein the Abbe number for said first and second lens elements is about 58.5.

10. A Cooke triplet lens comprising:

a first lens element, positive and biconvex, having an Abbe number in the range of 58–60;

a second lens element, positive and meniscus, also having an Abbe number in the range of 58–60, said second lens element being spaced apart from said first lens element, with an axis of said second lens element being aligned with an axis of said first lens element; and a third lens element interposed between said first and second lens elements, having an axis which is also aligned with said axes of said first and second lens elements, said third lens element being negative and having an Abbe number between 48 and 52.5, and an index of refraction which is less than 0.05 plus the average of the indices of refraction of said first and second lens elements.

11. The lens of claim 10 wherein said first and second lens elements are constructed of ophthalmic crown glasses.

12. The lens of claim 10 wherein at least one of said lens elements is constructed of glass.

13. The lens of claim 10 wherein the overall length of the Cooke triplet lens is less than one-sixth of its focal length.

14. The lens of claim 13 wherein:

said first lens element has first and second surfaces;

said third lens element has third and fourth surfaces; and said second lens element has fifth and sixth surfaces, each of said surfaces having radii of curvature as given in the following table, and each of said elements having an index of refraction ($n_d$) and an Abbe number ($v_d$) as given in the following table:

| Surface # | Radius (mm) | Thickness (mm) | $n_d$ | $v_d$ |
|---|---|---|---|---|
| 1 | 93.523 | 13.74 | 1.523 | 58.5 |
| 2 | −112.996 | 6.00 | 1.000 | |
| 3 | −64.327 | 3.00 | 1.532 | 48.8 |
| 4 | 125.431 | 10.07 | 1.000 | |
| 5 | −85.064 | 8.20 | 1.523 | 58.5 |
| 6 | −51.164 | 380.00 | 1.000 | | wherein a given thickness is the distance to the next surface, and the final thickness is the effective distance from the sixth lens surface to an image plane.

15. The lens of claim 13 wherein:

said first lens element has first and second surfaces;

said third lens element has third and fourth surfaces; and said second lens element has fifth and sixth surfaces, each of said surfaces having radii of curvature as given in the following table, and each of said elements having an index of refraction ($n_d$) and an Abbe number ($v_d$) as given in the following table:

| Surface # | Radius | Thickness | $n_d$ | $v_d$ |
|---|---|---|---|---|
| 1 | 101.222 | 13.86 | 1.523 | 58.5 |
| 2 | −101.222 | 5.29 | 1.000 | |
| 3 | −60.820 | 3.00 | 1.532 | 48.8 |
| 4 | 139.165 | 9.97 | 1.000 | |
| 5 | −81.173 | 8.33 | 1.523 | 58.5 |
| 6 | −49.636 | 380.00 | 1.000 | | wherein a given thickness is the distance to the next surface, and the final thickness is the effective distance from the sixth lens surface to an image plane.

16. The lens of claim 13 wherein:

said first lens element has first and second surfaces;

said third lens element has third and fourth surfaces; and said second lens element has fifth and sixth surfaces, each of said surfaces having radii of curvature as given in the following table, and each of said elements having an index of refraction ($n_d$) and an Abbe number ($v_d$) as given in the following table:

| Surface # | Radius | Thickness | $n_d$ | $v_d$ |
|---|---|---|---|---|
| 1 | 95.366 | 14.09 | 1.523 | 58.5 |
| 2 | −103.288 | 5.68 | 1.000 | |
| 3 | −60.592 | 3.00 | 1.523 | 51.5 |
| 4 | 124.507 | 10.37 | 1.000 | |
| 5 | −81.626 | 8.28 | 1.523 | 58.5 |
| 6 | −49.906 | 380.00 | 1.000 | | wherein a given thickness is the distance to the next surface, and the final thickness is the effective distance from the sixth lens surface to an image plane.

17. An overhead projector comprising:

a base having a stage area;

a light source for illuminating said stage area;

a Fresnel lens located at said stage area;

a projector head positioned above said base and stage area; and a projection lens located in said projector head, said projection lens including first and second lens elements, each being a positive lens and constructed of ophthalmic crown glass having an index of refraction in the range of 1.518 to 1.528; and a third lens element interposed between said first and second lens elements, said third lens element being a negative lens constructed of light flint glass, having a refractive index of less than about 1.573 and an Abbe number between 43 and 53.

18. The overhead projector of claim 17 wherein one of said crown elements is located on a long conjugate side of the projection lens and is biconvex, and the other one of said crown elements is meniscus.

19. The overhead projector of claim 17 wherein one of said crown elements is located on a short conjugate side of the projection lens and is biconvex, and the other one of said crown elements is meniscus.

20. The overhead projector of claim 17 wherein the Abbe number for said first and second lens elements is about 58.5, and the index of refraction of said first and second lens elements is in the range of 1.518 to 1.528.

* * * * *